3,548,445
VEHICLE DOOR HINGE
David C. Dehar, Dearborn Heights, Mich., assignor to Ford Motor Company, Dearborn, Mich., a corporation of Delaware
Filed July 10, 1968, Ser. No. 745,084
Int. Cl. E05d 3/06, 11/10
U.S. Cl. 16—146                                11 Claims

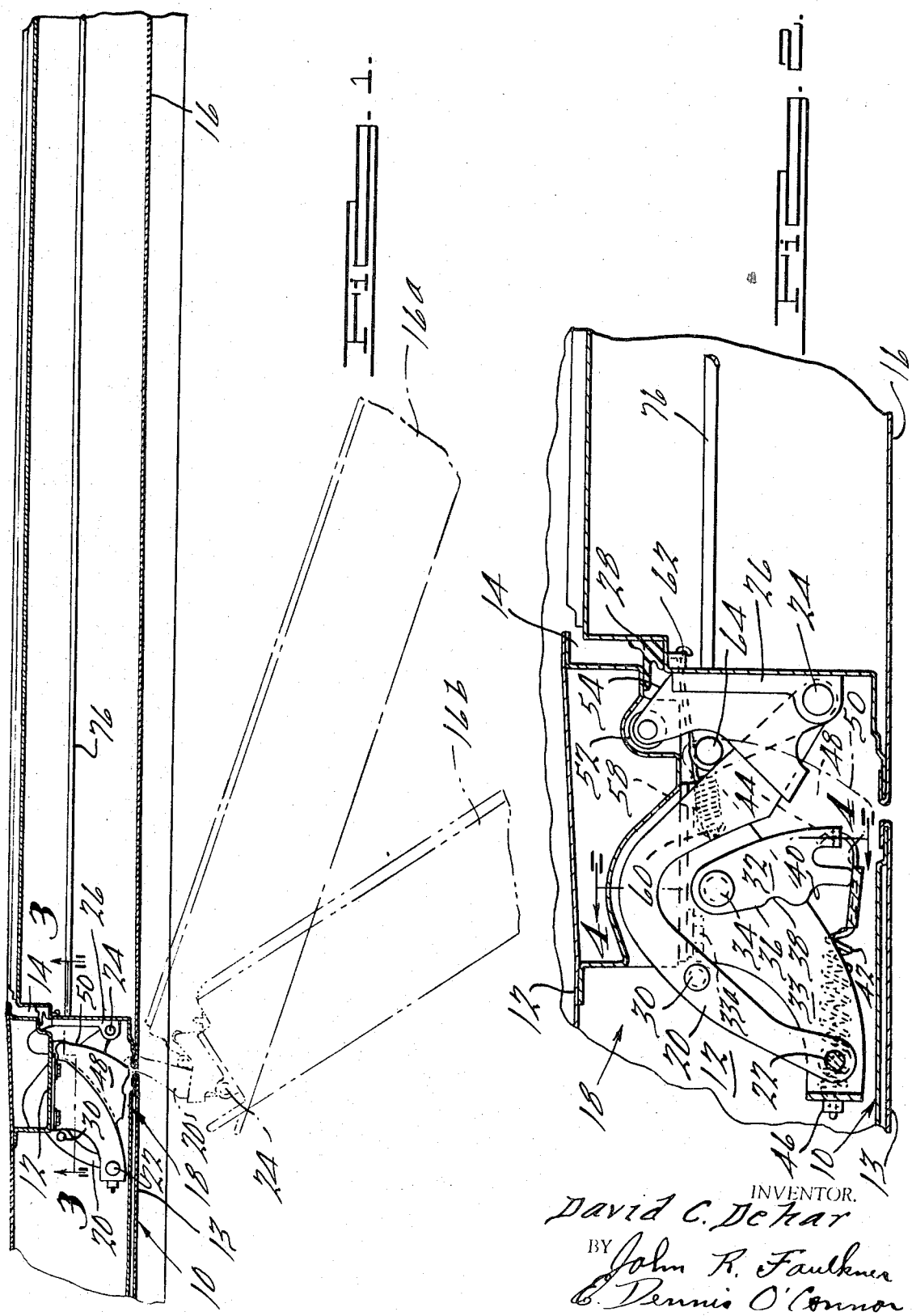

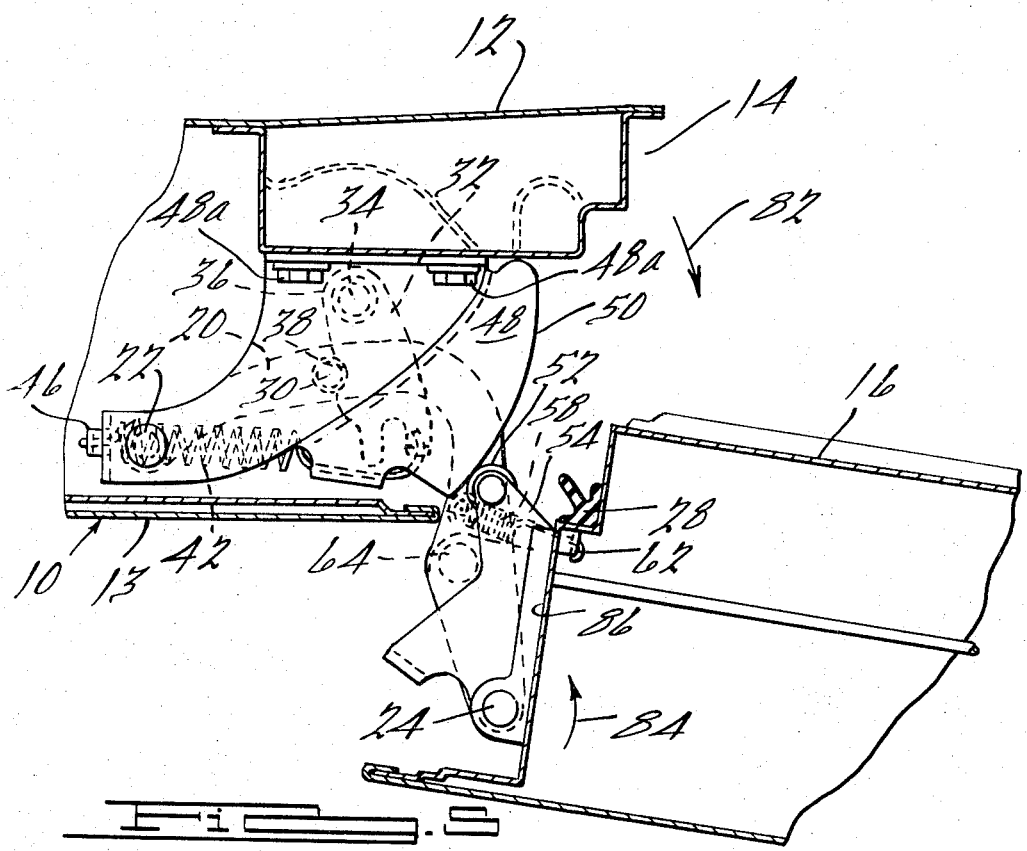

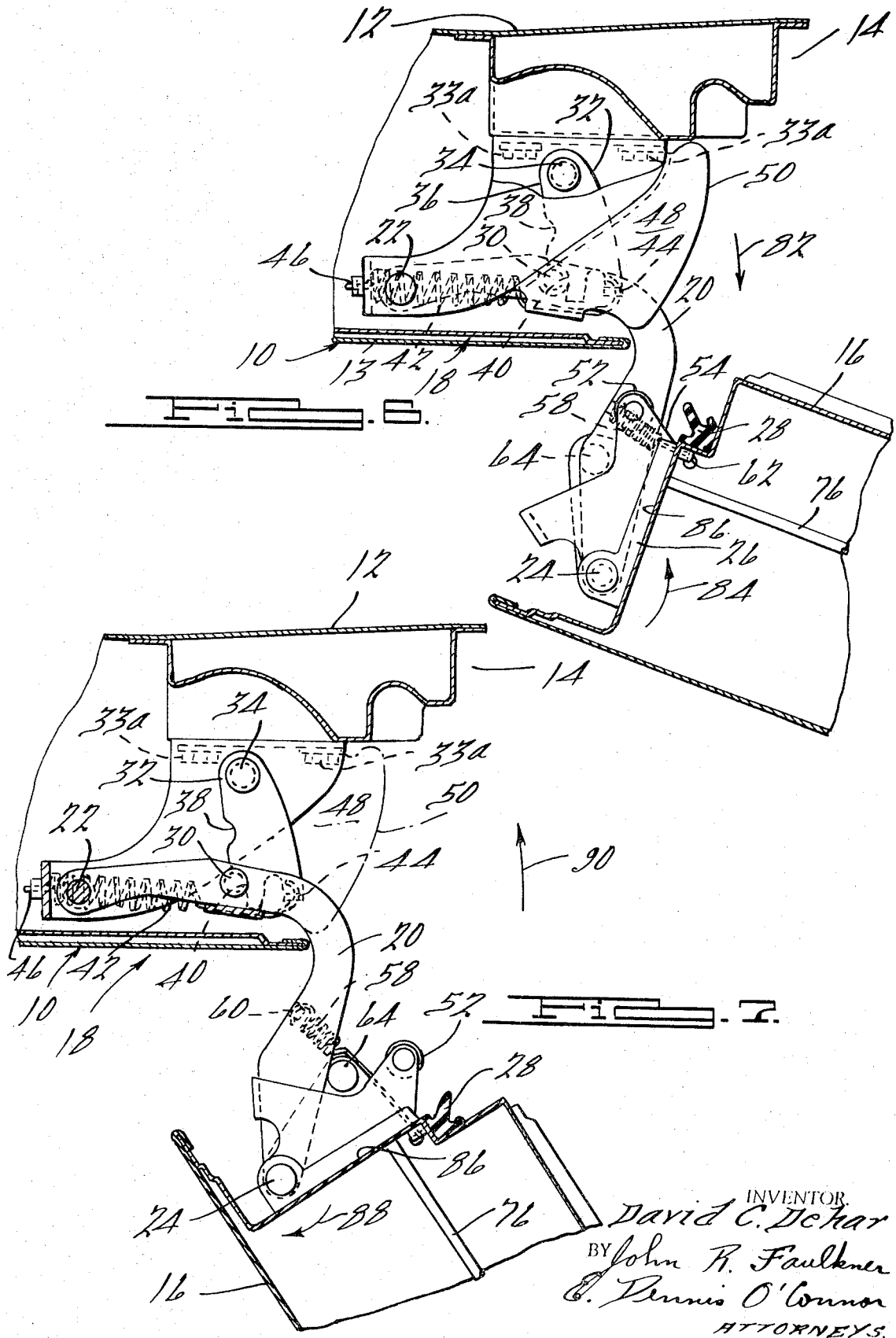

ABSTRACT OF THE DISCLOSURE

A hinge device for swingably mounting a vehicle door to vehicle body structure so that the door is movable between a closed position, a partially open position and a fully open position in a manner giving more convenient access and egress to the vehicle passenger compartment. Link means are provided for rotating the door simultaneously in a first direction about a first pivot point and in an opposite direction about a second point as the door moves from the closed position to the partially open position. During movement of the door from this latter position to the fully open position, locking means allow door rotation about only one of the pivot points.

BACKGROUND OF THE INVENTION

Most passenger car passenger compartment doors currently in use are connected near their forward jamb faces to vehicle body structure. The conventional hinge device utilized to accomplish this connection allows a vehicle door to be swung about a substantially vertical hinge axis that lies proximate to the forward end of the door. Vehicle passengers commonly are inconvenienced by such an arrangement when it is desired to enter or exit the vehicle passenger compartment when the vehicle is parked in close quarters, for example, closely adjacent another parked car.

This inconvenience arises because as the door opens and rotates about the hinge axis, the rearward end of the door that is remote from the hinge axis moves through an arc of substantial magnitude as compared to the forward portion of the door that may move only a very small distance. It may be appreciated that the rearward end of the door has a propensity to contact an obstruction to door movement, such as another parked car, before the forward portion of the door moves a sufficient distance from the vehicle body structure to permit the feet of the passenger to be placed on the ground. Not only does this condition cause inconvenience to vehicle passengers, but damage to the finish of outer door panels often results due to impact of these panels with obstructions located proximate to the vehicle.

It is an object of this invention to provide a vehicle door hinge for securing a leading portion of a passenger compartment door to door framing body structure such that the undesirable condition described above greatly is ameliorated. In particular, the door hinge of this invention provides for an increase in the ratio of forward door portion movement away from vehicle body structure to rearward door portion movement as the door is opened. An increase in this ratio provides for sufficient space to become available between the door and car body for the passenger to place his feet on the ground with a minimum of outward movement of the rearward end of the door. The rear edge of the door thus is less likely to be impacted and damaged when the vehicle is positioned in close quarters and the convenience of movement into and out of the vehicle greatly is increased.

SUMMARY OF THE INVENTION

A hinge device constructed in accordance with this invention is adapted for swingably mounting a closure for movement on a vehicle body between a fully closed position, an intermediate position and a fully open position. This hinge device includes a hinge link having one of its ends pivotally secured to the vehicle body at a first pivot point and the other of its ends pivotally secured to a jamb face of the closure at a second pivot point. When the closure is in the closed position, the jamb face of the closure pivotally connected to the hinge link is positioned remote from the sides of the hinge link. Upon the closure being moved from the fully closed position toward the intermediate position, the closure and hinge link swing about the first pivot point in a first rotational direction. Resilient means operatively secured to the hinge link and the closure exerts a force causing swinging movement of the closure about the second pivot point in a second rotational direction. This second rotational movement causes the jamb face to move towards one side of the hinge link as the closure moves toward the intermediate position from the closed position. Stop means secured to the vehicle body terminates movement of the hinge link about the first pivot point upon the closure reaching the intermediate position. In the intermediate position, the jamb face is located proximate to the one side of the hinge link. As the closure moves from the intermediate to the fully open position, the closure moves about the second pivot point by overcoming the force exerted by the resilient means and the jamb face moves away from the side of the hinge link.

DESCRIPTION OF THE DRAWINGS

FIG. 1 is a plan view, partially in section, of a portion of a motor vehicle body including a hinge device constructed in accordance with this invention;

FIG. 2 is an enlarged view of a portion of the structure of FIG. 1, illustrating in detail the hinge device of this invention;

FIG. 3 is a sectional view taken along the line 3—3 of FIG. 1;

FIG. 4 is a partial sectional view taken along the line 4—4 of FIG. 2;

FIG. 5 is a view similar to FIG. 2 but illustrating the closure member supported by the hinge device of this invention in a position between the fully closed and intermediate positions;

FIG. 6 is a view similar to FIG. 5, but illustrating the closure member in the intermediate position; and FIG. 7 is a view similar to FIG. 6, but illustrating the closure member in the fully open position.

DETAILED DESCRIPTION OF THE INVENTION

Referring now in detail to the drawings, and in particular to FIG. 1 thereof, the numeral 10 denotes generally a portion of a motor vehicle body including an integral door frame structure 12 and an outer body panel or fender 13 that operatively is secured to frame 12 by conventional means not illustrated. The door opening defined by the structure 12 is designated by the numeral 14. A closure or door 16 is illustrated in solid lines in FIG. 1 in a closed position wherein the plane of the closure 16 lies parallel to the longitudinal axis of the vehicle. A hinge device generally denoted by the numeral 18 swingably secures closure 16 to the frame structure 12 in a manner such that the closure is movable between the closed position illustrated in solid lines in FIG. 1, and an intermediate position and a fully open position illustrated in ghost by the numerals 16a and 16b respectively.

Referring now to FIGS. 2, 3 and 4 of the drawings, the details of the construction of hinge device 18 may be appreciated. Hinge device 18 includes an arcuate hinge link 20 having one of its ends pivotally connected to structure 12 by means of a pivot shaft 22. The end of hinge link 20 remote from pivot shaft 22 pivotally is connected by means of a pivot shaft 24 to a hinge leaf 26 secured to closure 16. As may be seen from FIG. 2, arcuate hinge link 20 is oriented such that the concave surface of said hinge link faces outboard of the vehicle when closure 16 is in the closed position illustrated. In this position, an elastomeric seal 28 provides for a weathertight fit between structure 12 and closure 16.

Secured to and extending downwardly from hinge link 20 is a door check roller 30. Also located below hinge link 20 is a door check member 32 that pivotally is secured to a bracket 33 by means of a pivot shaft 34. Bracket 33 is secured to structure 12 by means of fasteners 33a. Door check member 32 has a cam surface 36 with indentations 38 and 40 formed therein.

Door check member 32 is biased towards the position illustrated in FIG. 2 by means of a tension spring 42. One end of spring 42 is secured to door check member 32 at point 44, while the other end of spring 42 is secured to stationary bracket 33 at point 46. In general, the door check feature of hinge device 18 holds closure 16 in either of two open positions. This door check feature is accomplished by roller 30 riding along cam surface 34 and displacing door check member 32 against the force of spring 42 until roller 30 is received in either of the indentations 38 or 40. The operation of this door check feature as closure 16 is moved from the closed position to the fully open position will be described in greater detail below.

A stationary cam 48 is secured to structure 12 by means of fasteners 48a (FIG. 3), and has formed thereon a cam surface 50. A cam follower 52 comprising a roller is secured for rotation to a bracket 54, extending from closure 16 and secured to said closure by fasteners 56 (FIG. 3). As closure 16 is moved from the closed position, cam follower 52 is urged into engagement with surface 50 of cam 48 by means of a tension spring 58. One end of spring 58 is secured at point 60 to bracket 32 and the other end of spring 58 is secured at 62 to closure 16. A more detailed explanation of the functioning of this apparatus is included below.

Referring now to FIG. 3 of the drawing, there can be seen a pin 64 extending through a vertical opening 66 formed through bracket 54. Opening 66 has an enlarged portion in which is positioned collar 64a, integral with pin 64, that acts as a stop on upward movement of pin 64. A compression spring 68, positioned in opening 66, bears on collar 64a and urges pin 64 upwardly toward the position illustrated in FIG. 3. A shaft 70 extends downwardly from collar 64a and is pivotally connected at 71 to an L-shaped lever 72. Lever 72 is pivotally connected for rocking motion at 74 to closure 16. The end of lever 72 remote from shaft 68 is pivotally connected at point 78 to a control rod 76.

This control rod 76 is connected, remote from hinge device 18, to the latch mechanism of closure 16 (not illustrated), such that upon the latch mechanism becoming unlatched when closure 16 is to be opened, rod 76 moves to the left as illustrated by the arrow 80 in FIG. 3. Such movement of rod 76 causes lever 72 to be rocked in a counterclockwise direction as viewed in FIG. 3 until it assumes the position illustrated in ghost at 72a. With lever 72 in the position 72a, it readily may be appreciated that pin 64 is moved downward against the force of compression spring 66. The function of pin 74 and the significance of the movement of pin 64 will be treated in detail below.

Referring now to FIG. 5 of the drawing, there is illustrated the position of closure 16 between the closed and intermediate positions such as when entry or egress from the vehicle passenger compartment through opening 14 is desired when the vehicle is parked in close quarters. When the latch mechanism of closure 16 is disengaged and closure 16 is swung open manually in a conventional manner, the closure and hinge link 20 rotate about pivot shaft 22 as in a conventional hinge mechanism. Mere rotation of closure 16 and hinge link 20 about a single vertical hinge axis that is concentric with the longitudinal axis of pivot shaft 22 would cause the end of closure 16 remote from hinge device 18 to contact an obstruction such as a closely parked vehicle before the end of closure 16 proximate hinge device 18 were sufficiently removed from structure 12 to allow easy movement of a passenger through opening 14. Such a disadvantage is eliminated by hinge device 18 due to the force exerted by tension spring 58 on closure 16.

As described above, the force of tension spring 58 causes a rotation of closure 16 about pivot shaft 24 as indicated by the arrow 84 in FIG. 5. This rotation about pivot shaft 24 is in a direction opposite to the rotation of closure 16 about pivot shaft 22. It readily may be appreciated that these two rotations in opposite directions occur simultaneously for a time as the door is moved from a fully closed position toward the position illustrated in FIG. 5. The force exerted by spring 58 also causes cam follower 52 to move along surface 50 of cam 48 as the closure 16 moves outwardly from body 12. The interaction between cam follower 52 and cam surface 50 orients the end of closure 16 proximate hinge device 18 such that the ratio of the outward movement of this end of closure 16 to the magnitude of outward movement of the end of closure 16 remote from hinge device 16 is greater than closure members used in conjunction with prior art hinges. Such movement increases of course, the space between the forward end of the closure and structure 12 when the rearward end of the closure is stopped from further movement by the presence of an obstacle.

As closure 16 moves from the closed position illustrated in FIG. 2 to the position illustrated in FIG. 5, check roller 30 mounted on hinge link 20, moves along surface 36 of check member 32. Contact between roller 30 and surface 36 is maintained by the force of spring 42 that urges check member 32, which is pivotally mounted on shaft 34, into engagement with the roller. The position of FIG. 5 is reached when check roller 30 is received in the indentation 38 in surface 36. The force exerted by spring 42 on check member 32 tends to hold roller 30 in indentation 38 and maintain closure member 16 in the position illustrated in FIG. 5. At this time, cam follower 52 remains in contact with surface 50 of cam 48.

FIG. 6 illustrates the position of the parts when closure 16 has reached the intermediate position. As the door moves outwardly from body structure 12 from the position illustrated in FIG. 5 toward the position illustrated in FIG. 6, the rotation of closure 16 in opposite directions about both pivot shaft 22 and pivot shaft 24 continues. When sufficient movement of closure 16 has occurred, cam follower 62 reaches the end of cam surface 50 and the force exerted by tension spring 58 causes rotation about pivot shaft 24 in the direction illustrated by the arrow 84 so that the jamb face 86 of closure 16 moves into contact with a side of hinge link 20. This movement of jamb face 86 provides for an even greater magnitude of the ratio of the magnitude of outward movement of the end of closure 16 proximate to hinge device 18 relative to the magnitude of outward movement of closure 16 remote from hinge device 18. When jamb face 86 contacts link 20 as in FIG. 6, further rotation of closure 16 about pivot shaft 24 in the direction of arrow 84 is prevented.

When closure 16 has reached the intermediate position illustrated in FIG. 6, door check roller 30 has moved a sufficient distance along cam surface 36 of door check member 32 such that it is received in indentation 40 formed in said face 36. The force of spring 42 tends to hold roller 30 in this position. It should be noted that when hinge link 20 reaches the position illustrated in FIG. 6, further rotation of hinge link 20 about pivot shaft 22 is impossible as a positive stop of such rotation is provided by the outer body structure 13 that is contacted by hinge link 20 when the latter is in the position illustrated in FIG. 6.

FIG. 7 illustrates the position of the parts with closure 16 in the fully open position. As closure 16 is moved from the position illustrated in FIG. 6 toward the position illustrated in FIG. 7, it rotates only about the pivot shaft 24 since further rotation of hinge link 20 and closure 16 about pivot shaft 22 is impossible. This rotation is illustrated by the arrow 88 in FIG. 7 and is opposite in direction to previous rotation of closure 16 about pivot shaft 24. This may be illustrated by observing that the rotation illustrated by the arrow 84 in FIG. 6 is counterclockwise as viewed in the drawings, while the direction of rotation illustrated by the arrow 88 in FIG. 7 is clockwise. The rotation illustrated by the arrow 88 is made possible only by overcoming the force exerted by compression spring 58 that tends to urge jamb face 86 of closure 16 towards hinge link 20.

This single rotation about pivot shaft 24 by closure 16 in a direction that is clockwise as viewed in FIG. 7 provides for wide open access and egress through opening 14 into the vehicle passenger compartment.

As was set forth above, pin 64 (best seen in FIG. 3), is moved downward when the latch mechanism that holds closure 16 in the closed position manually is unlatched. The magnitude of downward movement of pin 64 is such that the top face 92 of pin 64 moves below the bottom surface of hinge link 20 as viewed in FIG. 3. As closure 16 is moved from the closed position, pin 64 moves under hinge link 20 so that contact between surface 92 of pin 64 and the bottom surface of the hinge link 20 prevents upward movement of the pin 64 into its original position.

It may be seen from FIGS. 5 and 6 that as closure 16 is moved from the closed position toward the fully open position, pin 64 at all times is positioned beneath hinge link 20 such that contact between surface 92 of the pin and the hinge link prevents upward movement of the pin. When closure 16 reaches the position illustrated in FIG. 7, however, pin 64 has moved to a position wherein it no longer underlies hinge link 20. At this time, the force of compression spring 66 urges pin 64 upward and said pin abuts against the side surface of hinge link 20 as illustrated in FIG. 7. In this position, pin 64 prevents a counterclockwise rotational movement of closure 16 about pivot shaft 24 when the closure is moved from the fully open position back to the closed position.

Thus it may be seen that closing closure 16 from the fully open position constitutes a simple rotational movement of all movable parts about pivot shaft 22 in a counterclockwise rotational direction illustrated by the arrow 90 of FIG. 7. When this rotation is sufficient so that closure 16 once again lies in a plane substantially parallel to the longitudinal plane of the vehicle, all parts have returned to the position illustrated in FIG. 2.

It thus may be seen that this invention provides a hinge device for swingably mounting a vehicle closure or door to vehicle body structure such that the closure is movable between a closed position, intermediate position and fully open position. Movement of the closure between the closed and intermediate positions is such that the magnitude of movement of that portion of the closure proximate the hnige device is relatively great compared to prior art devices. This large magnitude of outward movement of the end of the closure proximate the hinge device provides for increased passenger convenience during access and egress to and from the vehicle passenger compartment when the vehicle is parked in close quarters that prevent full opening of the closure. This relatively large movement of the end of the closure proximate the hinge device is made possible by a simultaneous rotation of the closure about two distinct hinge axes in opposite directions. Movement of the closure from the intermediate to the fully open position involves rotation of the closure about only one of these pivot axes, however. Closing of the closure from the fully open to the closed position is made convenient by locking the closure relative to the hinge link such that rotation only about one of the pivot axes is possible.

It is to be understood that this invention is not limited to the exact construction illustrated and described above, but that various changes and modifications may be made without departing from the spirit and scope of the invention as defined in the appended claims.

I claim:

1. A hinge device for swingably mounting a closure for movement on a vehicle body between a closed and a first open position, said device including: a hinge link pivotally secured to said body at a first pivot point and pivotally secured to said closure at a second pivot point, said closure and hinge link swinging about said first pivot point in a first rotational direction as said closure is moved from the closed position toward the first open position, and resilient means operatively connected to said closure and exerting a force thereon to swing said closure about said second pivot point in a second rotational direction as said closure is moved from the closed position toward the first open position, said second rotational direction being opposite to said first rotational direction.

2. The device of claim 1, wherein said resilient means comprises a tension spring having one of its ends secured to said hinge link and the other of its ends secured to said closure.

3. The device of claim 1, further including cooperating control means operatively secured to said closure and said body and regulating movement of the former about said second pivot point.

4. The device of claim 3, said control means comprising a cam secured to said body and a cam follower secured to said closure.

5. The device of claim 1, further including stop means secured to said body and terminating swinging movement of said hinge link and closure about said first pivot point when said closure is in the first open position.

6. The device of claim 5, said device permitting movement of said closure to a second open position remote from said closed position relative to said first open position, movement of said closure from said first to said second open position being rotational movement against the force exerted by said resilient means and about said second pivot point in a rotational direction opposite to said second rotational direction.

7. The device of claim 6, further including latch means locking said closure against movement about said second pivot point upon said closure reaching the second open position.

8. A hinge device for swingably mounting a closure for movement on a vehicle body between a fully closed, an intermediate and a fully open position, said hinge device including: a hinge link having one of its ends pivotally secured to said body at a first pivot point and the other of its ends pivotally secured to a jamb face of said closure at a second pivot point, said jamb face being positioned remote from the sides of said hinge link when said closure is in the closed position, said closure and hinge link swinging about said first pivot point as said closure is moved from the fully closed position toward the intermediate position, resilient means operatively secured to said hinge link and said closure and exerting a force causing swinging movement of said closure about said second pivot point such that said jamb face moves toward one side of said hinge link during closure movement toward the intermediate position from said closed position, stop means secured to said body and terminating movement of said hinge link about said first pivot point upon said closure reaching the intermediate position, said jamb face being located proximate said one hinge link side when said closure reaches the intermediate position, said closure being swung about said second pivot point from the intermediate to fully open position by overcoming the force exerted by said resilient means such that said jamb face moves away from said one hinge link side.

9. The hinge device of claim 8 including intermittently engageable latch means locking said closure against movement around said second pivot point upon said closure reaching the fully open position.

10. The hinge device of claim 8, further including cooperating control means operatively secured to said closure and said body and regulating movement of the former about said second pivot point during closure movement from the fully closed position to the intermediate position.

11. The hinge device of claim 10, said control means comprising a cam secured to said body and a cam follower secured to said closure.

References Cited

UNITED STATES PATENTS 2,870,477    1/1959    Anthony et al. _____ 16—146

BOBBY R. GAY, Primary Examiner

D. L. TROUTMAN, Assistant Examiner

U.S. Cl. X.R.

16—163